United States Patent
Dowzall et al.

(10) Patent No.: US 6,393,676 B1
(45) Date of Patent: May 28, 2002

(54) PICTURE FRAME CORNER CLAMP

(75) Inventors: Martin Dowzall, Franklin Lakes; David Wellings Pointen, Rivervale, both of NJ (US)

(73) Assignee: Nielsen & Bainbridge LLC, Paramus, NJ (US)

(*) Notice: Subject to any disclaimer, the term of this patent is extended or adjusted under 35 U.S.C. 154(b) by 0 days.

(21) Appl. No.: 09/605,301

(22) Filed: Jun. 28, 2000

Related U.S. Application Data

(60) Provisional application No. 60/143,885, filed on Jul. 15, 1999.

(51) Int. Cl.⁷ .............................. F16B 7/00; G09F 1/12
(52) U.S. Cl. ........................... 24/568; 40/785; 403/402
(58) Field of Search ..................... 24/568; 403/362, 403/402, 403, 295; 40/784, 785; 285/424

(56) References Cited

U.S. PATENT DOCUMENTS

| | | | | |
|---|---|---|---|---|
| 4,509,775 A | * | 4/1985 | Arnoldt ................ 285/424 X |
| 4,525,945 A | * | 7/1985 | Shultz .................. 40/785 |
| 4,531,315 A | * | 7/1985 | Sobel .................. 40/785 |
| 4,694,598 A | | 9/1987 | Eisenloeffel ........... 40/155 |
| 4,718,184 A | | 1/1988 | Sherman ............... 40/155 |
| 4,825,529 A | | 5/1989 | Sawada et al. ......... 29/525.1 |
| 5,384,978 A | | 1/1995 | Peters ................. 40/155 |
| 5,423,576 A | * | 6/1995 | Hunter ................. 285/424 X |
| 5,423,626 A | | 6/1995 | Peters ................. 403/362 |
| 5,779,430 A | * | 9/1998 | Fremstad .............. 40/785 |

* cited by examiner

Primary Examiner—Robert J. Sandy
(74) Attorney, Agent, or Firm—Darby & Darby

(57) ABSTRACT

An improved picture frame clamp assembly includes an L-shaped screw plate, and an L-shaped backing plate. Both plates are elastically secured to each other by an elastic member, resulting in an L-shaped clamp assembly with the screw plate shifted slightly with respect to the backing plate. The screw plate and the backing plate each include two legs. Each of these legs are sized to fit within a receiving channel of a picture frame section. The magnitude of offset between the screw plate and the backing plate is preferably such that the sum of this offset distance and the width of the legs is equal to or larger than the width of the receiving channel. This arrangement ensures that upon insertion into the receiving channel of a frame section, the screw plate will be biased against an inside wall of the receiving channel, while the backing plate will be biased against an opposing wall of the receiving channel due to the spring bias of the elastic member. The result is that each frame section is urged into tight engagement and alignment with the legs of the clamp assembly.

13 Claims, 4 Drawing Sheets

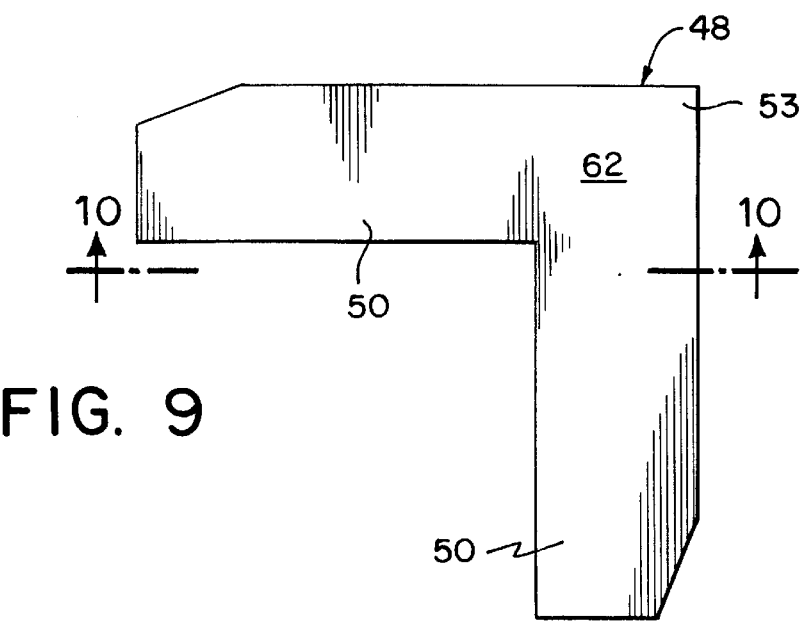
FIG. 9
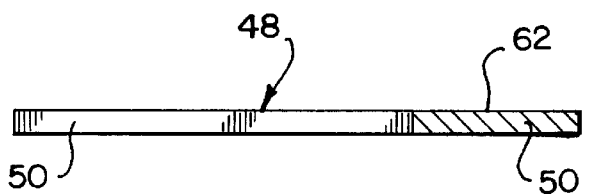
FIG. 10
FIG. 11
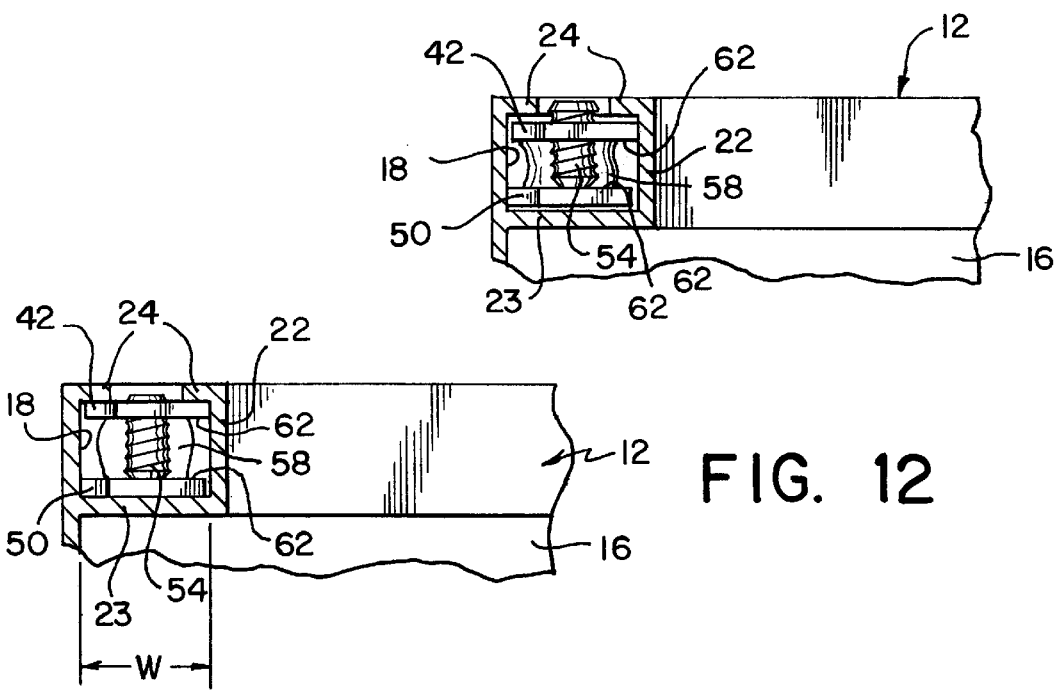
FIG. 12

PICTURE FRAME CORNER CLAMP

This application claims benefit of 60/143,885, Jul. 15, 1999.

BACKGROUND OF THE INVENTION a) Field of the Invention

This invention generally relates to picture frames and, more particularly, to corner clamp assemblies used to secure together individual frame members along a miter joint.

b) Description of the Prior Art

A common type of commercially available picture frame includes frame sections formed from extruded metal, usually aluminum. Each frame section includes longitudinal receiving channels which are accessible from the ends and back of the frame section. The frame sections are connected to each other (end-to-end) to form a rectangular frame using a corner clamp assembly located at each corner of the frame.

As shown in FIGS. 1 and 2, labeled PRIOR ART (and described in greater detail below), a conventional corner clamp assembly includes two L-shaped metal plates (an upper screw-plate and a lower backing-plate), each having two "legs" (forming the L-shape). Each leg of each plate is inserted into the receiving channel of a frame section, so that the plates are positioned across a miter joint. One L-shaped plate includes two-threaded openings, one in each leg. Each threaded opening is adapted to receive a threaded set-screw. When the top and bottom L-shaped plates are positioned within the channels of two adjacent frame sections, advancing the set-screws of the upper L-shaped plate causes a lower end of each screw to contact the backing L-shaped plate, forcing the two L-shaped plates to move away from each other. The separation force generated by the advanced set-screws causes the two L-shaped plates to effectively jam within the extruded frame channels, clamping the two adjacent frame members together.

Although this type of conventional corner clamp is generally effective in securing frame sections together, conventional clamps are made up of two separate elements that must be assembled within the appropriate channel of each frame section to assemble the picture frame. This clamp-assembly operation is time consuming. Also, because each conventional corner clamp assembly includes two separate and different elements, some difficulty arises in keeping track of each element prior to use (i.e., inventory) and during the assembly of a picture frame. Framers must first match both elements of each corner clamp to be used and then assemble the separate pieces into each receiving channel of two adjacent frame sections. Although, this matching and assembly procedure may require only a minute or so for each corner clamp, the professional framer will lose a substantial amount of collective assembly time when assembling hundreds of corner clamps a day.

Another problem associated with the above-described prior art is that the clamp, although providing a tremendous amount of transverse (separation) force to hold two adjacent picture frames tightly together, fails to introduce any effective lateral force to help hold each frame section in alignment along their abutting miter joint, prior to, and during securement of the clamp in the channel. The clamp elements can easily fall out of the frame section during assembly.

It is not uncommon for the framer to improperly cut a miter joint of a frame section, resulting in an assembled picture frame that includes a slight gap along one or more corners. This gap is readily noticeable because it generally exposes a portion of the relatively bright aluminum metal located under the colored paint layer. In addition to a miter gap being formed during the assembly of a picture frame, another assembly-related problem is that since the prior art corner clamps offer only a loose lateral fit when positioned within a receiving channel prior to being secured within the channel, the inserted corner clamp may shift laterally with respect to the frame sections. This lateral shifting may result in one frame section becoming offset or misaligned with respect to the other. As illustrated in FIGS. 1 and 2, labeled PRIOR ART, misalignment of frame sections results in one frame section extending beyond the other frame section at the miter joint, again exposing a portion of the bare metal of the frame section.

U.S. Pat. No. 4,694,598 issued to Eisenloffel discloses a compression clamp for securing two adjacent picture frame sections together across a miter joint. The clamp of U.S. Pat. No. 4,694,598, which is sized and shaped to fit within appropriate channels located in the frame section, includes a flat L-shaped plate having a threaded opening in each leg for receiving a threaded screw. Adjacent to each threaded opening of each leg are transverse opposing arms which are bent around each leg to form a structure that is generally rectangular in cross section. Each arm includes an arm-end that is curved upwardly towards a lower end of the screw so that as the screw is tightened, the arm-ends are forced downwardly which causes the arm structure to deform and expand within the channel of the frame section. As the screws of the compression clamp of U.S. Pat. No. 4,694,598 are tightened, the clamp will generate both transverse and lateral forces which help bind each leg of the clamp within the respective channels of each frame section. The clamp of U.S. Pat. No. 4,694,598 introduces no lateral force to the frame sections when the clamp is first inserted within the channel of the frame sections, but only when the screws are being tightened and the clamp is already binding within the channels. The lateral forces generated by the clamp of U.S. Pat. No. 4,694,598 may actually cause one frame section to become misaligned with respect to the other frame section, as the screws are tightened.

U.S. Pat. No. 5,423,626 issued to Peters discloses a clamping assembly for securing two adjacent frame sections together across a miter joint, including two L-shaped plates. One plate has threaded openings that receive screws, while the other plate has recesses that are slightly offset with respect to the threaded openings. The two plates are positioned against each other and inserted into appropriate channels of each frame section. As the screws are tightened, their lower ends enter the offset recesses which causes the two plates to move transversely apart from each other and simultaneously shift laterally within the channel of each frame section.

The clamp assembly of U.S. Pat. No. 5,423.626 is similar to the clamp assembly of U.S. Pat. No. 4,694,598 in that both clamp assemblies introduce laterally directed forces to the frame sections only when the screws are tightened and the clamp binds within the channels of the frame sections.

It would be beneficial to provide a clamp assembly for use with picture frames which introduces a lateral force to the frame sections upon insertion into appropriate channels of the frame sections.

Accordingly, it is an object of the present invention to provide a corner clamp assembly that generates both transverse and lateral clamping forces which are useful in holding the individual frame members of a picture frame together which overcomes the deficiencies of the prior art.

Another object of the invention is to provide a corner clamp for securing individual frame members together which is inexpensive to manufacture and easy to use.

Another object of the invention is to provide a corner clamp for securing individual frame members together which generates a lateral force independent of any transverse force generated.

Another object of the invention is to provide a corner clamp for securing individual frame members together which is easier and faster to install than prior art clamps.

SUMMARY OF THE INVENTION

An improved picture frame corner clamp assembly includes an L-shaped screw plate and an L-shaped backing plate. According to the invention, both plates are elastically secured to each other by an elastic member, resulting in an L-shaped corner clamp assembly preferably having the screw plate shifted slightly with respect to the backing plate. The screw plate and the backing plate each include two legs. Each of these legs is sized to fit within a receiving channel of a picture frame section. The magnitude of offset between the screw plate and the backing plate is preferably such that the sum of this offset distance and the width of the legs is equal to or larger than the width of the receiving channel. This arrangement ensures that upon insertion into the receiving channel of a frame section, the screw plate will become biased against an inside wall of the receiving channel, while the backing plate will become biased against an opposing (outer) wall of the receiving channel, due to the spring action of the elastic member connecting the two plates together. The result is that each frame section is urged into tight engagement and alignment with the legs of the clamp assembly, ensuring that adjacent frame sections are secured and properly aligned with each other along their mitered edges.

BRIEF DESCRIPTION OF THE DRAWINGS

FIG. 9 is a plan view of a backing L-shaped plate, according to the invention;

FIG. 10 is a sectional side view of the backing L-shaped plate, taken along the line 10—10 of FIG. 9, according to the invention;

FIG. 11 is a sectional side view of the frame clamp assembly, taken along the lines 11—11 of FIG. 3, showing a clamp assembly located within a channel of a frame section prior to being tightened; and FIG. 12 is a sectional side view of the frame clamp assembly similar to the view of FIG. 11, shown in a tightened position, according to the invention.

DETAILED DESCRIPTION OF THE PREFERRED EMBODIMENTS

Figure 1:
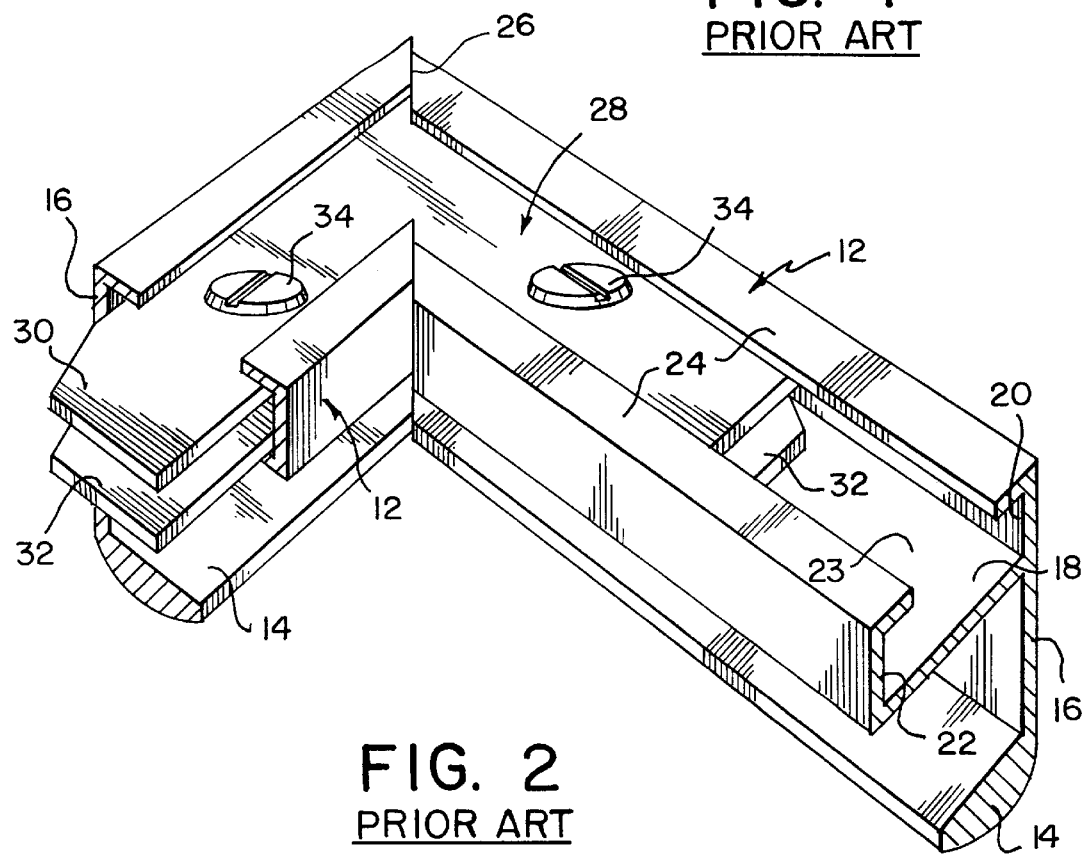
FIG. 1 is a perspective view of a conventional frame clamp assembly, labeled PRIOR ART, shown mounted within two misaligned conventional picture frame sections (shown in part)
Figure 2:
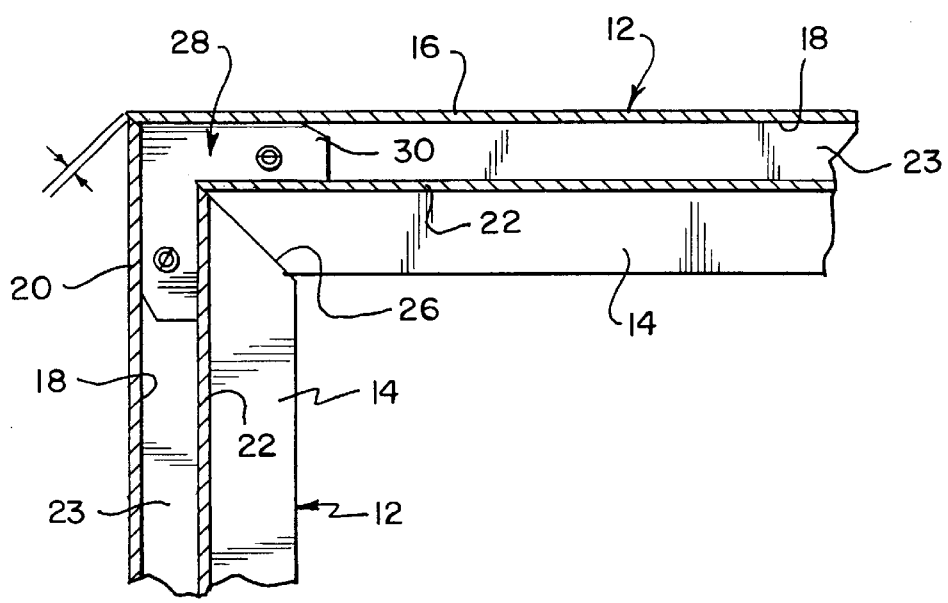
FIG. 2 is a rear view of a PRIOR ART frame clamp assembly, shown holding two misaligned frame sections together.

As introduced in the Background section of the application, and referring to FIGS. 1 and 2, a conventional picture frame is typically constructed from four frame sections 12 which are preferably formed from an extruded metal, such as aluminum. Each frame section 12 is of substantially identical cross-section, and, as shown in FIG. 1, includes an inwardly-directed glass-supporting flange 14, an outer wall 16, and a receiving channel 18 having a generally rectangular cross-section. Receiving channel 18 is defined by an outer channel wall 20 (which is coplanar with outer wall 16, in the example shown), an inner channel wall 22, a channel floor 23, and two overhanging lips 24 extended over receiving channel 18 from an upper edge of each opposing wall 20 22.

The above-described frame sections 12 are conventional and are typically secured to each other end-to-end along a 45° miter joint 26, using an L-shaped bracket or corner clamp assembly 28. As described in the background section of this application, and referring to FIG. 1, the prior art L-shaped corner clamp assembly 28 is made up of two L-shaped elements, a rearward screw plate 30, and a forward backing plate 32. Screw plate 30 supports two set-type screws 34 which are used to force screw plate 30 away from backing plate 32 after the prior art clamp assembly 28 has been inserted into the receiving channels 18 of two adjacent frame sections 12. As introduced in the Background section of this application, this prior art type of corner clamp assembly 28 is relatively awkward to assemble within the receiving channels 18 of the frame because the framer must assemble and align two separate L-shaped elements and maintain the careful alignment prior to and during the tightening of screws 34. As may be appreciated by professional framers, it is a difficult task to hold each of two adjacent frame sections 12 together in alignment across their common miter joints 26 and simultaneously use a screwdriver to tighten the two screws. Frequently, during this procedure, one frame section will shift with respect to the other, which results in a bare metal portion of frame section 12 being exposed (forming an over-bite) along the miter joint 26. An example of an over-bite condition is illustrated in FIGS. 1 and 2.

Figure 3:
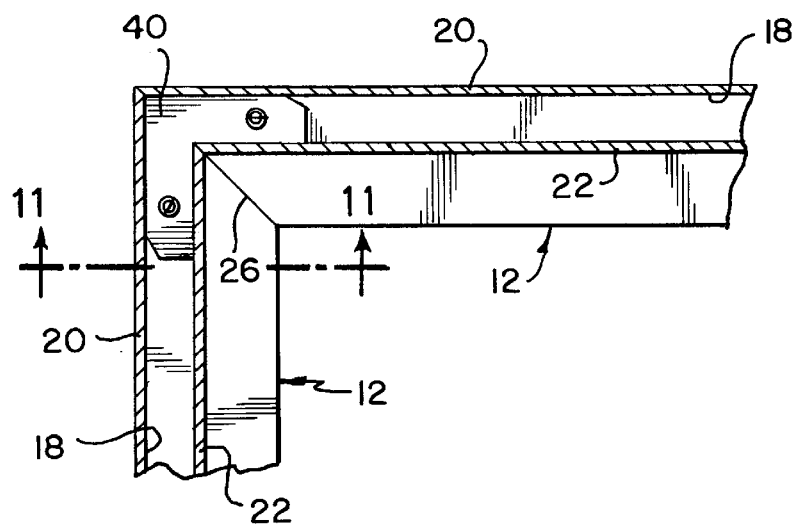
FIG. 3 is a rear view of a frame clamp assembly, according to the present invention, shown holding two aligned frame sections together.
Figure 4:
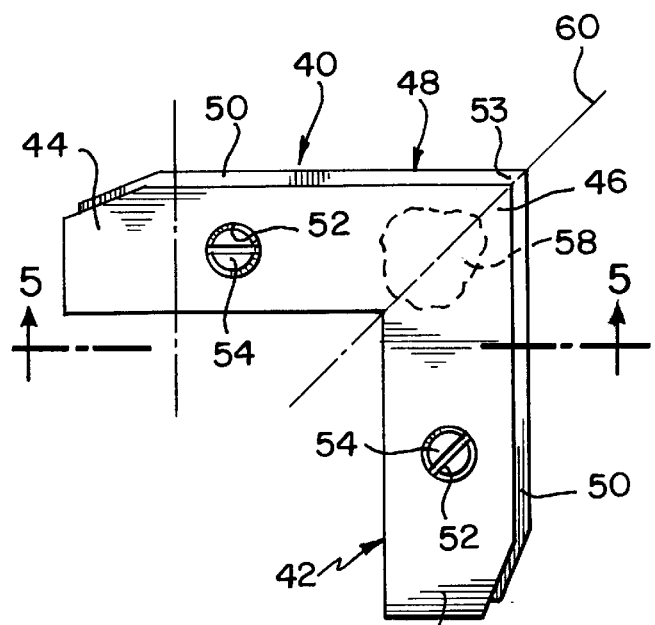
FIG. 4 is a plan view of a frame clamp assembly, according to the invention.
Figure 5:
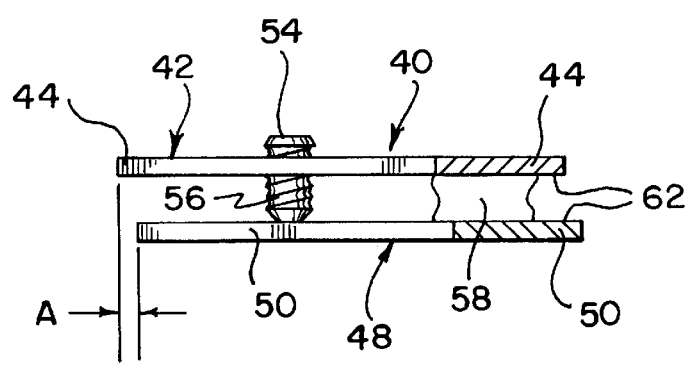
FIG. 5 is a sectional view of the frame clamp assembly of FIG. 4, taken along the line 5—5, according to the invention.

According to the invention, and as shown in FIGS. 3, 4 and 5, adjacent frame sections 12 are biased into alignment along their common miter joints 26 by a spring-biased corner clamp assembly 40. Corner clamp assembly 40, includes an L-shaped screw plate 42 having legs 44 extending from a corner region 46, and an L-shaped backing plate 48 having legs 50 extending from a corner region 53. Screw plate 42 preferably includes a threaded opening 52 along each leg 44. Each threaded opening 52 includes threads (not shown) which are adapted to engagingly receive a threaded screw 54, having threads 56 (FIG. 5).

According to the invention, L-shaped screw plate 42 is resiliently connected to L-shaped backing plate 48 by an elastic connection 58 (shown in dashed lines in FIG. 4). Elastic connection 58 is preferably attached to corner region 46 of screw plate 42 and corner region 52 of backing plate 48, and defines a resting (i.e., unstressed) position as shown in FIGS. 4 and 5. The purpose of elastic connection 58 is to flexibly attach screw plate 42 to backing plate 48 while providing limited relative spring-biased movement between them. Elastic connection 58 is resilient and, in shear, functions as a spring (providing an elastic shear between the two joined plates). According to a preferred embodiment of the invention, elastic connection 58 elastically bonds a portion (corner region) of screw plate 42 to a corresponding portion of backing plate 48 with one plate slightly offset, as illustrated in FIGS. 4 and 5. The offset, which is preferably directed along a diagonal line 60, may be about 0.015 inches (as indicated by dimension A in FIG. 5). The magnitude of the diagonally-directed offset will vary depending on the size and shape of receiving channel 18 and the size and type of picture frame sections 12.

The magnitude of the diagonally-directed offset should allow screw plate 42 and backing plate 48 to provide sufficient interference when inserted within receiving channel 18 to force the two legs of screw plate 42 against inner channel wall 22 of receiving channel 18 and simultaneously force backing plate 48 against an opposing outer channel wall 20 of channel 18, against the spring-bias of elastic connection 58. It is preferred that the sum of the width of the screw plate legs 44 (as measured along transverse line 61 in FIG. 4) and the magnitude of offset A is equal to or greater than the corresponding width of receiving channel 18 (as measured along width-line W of FIG. 12). This elastic shear (laterally directed force) exerted by screw plate 42 and backing plate 48 within receiving channel 18 helps align two adjacent frame sections 12 along their common miter joint 16. The elastic shear further helps compensate for slight manufacturing irregularities of the extruded frame sections 12 due to wear of the extrusion die.

In addition to effectively self-aligning the miter joints 26 of two adjacent frame sections 12, the elastic connection 58 also physically combines the two separate framing elements (i.e., the screw plate and the backing plate) into a single, easily handled clamping element which allows for quicker and easier frame assembly and also results in fewer separate elements to keep track of prior to frame assembly. Furthermore, the elastic shear (lateral force) generated by the elastic connection 58 in combination with the offset arrangement between screw plate 42 and backing plate 48 encourages frame clamp assembly 40 to retain its position after being inserted within receiving channels 18 and prior to securement of frame clamp 40 within receiving channels 18 by tightening screws 54, as described in greater detail below.

Elastic connection 58 may be any suitable material which is easily and effectively adhered to a metallic surface and which provides desired elastomeric properties. A preferred material for use as elastic connection 58 is an adhesive material such as HL-7216 Hot Melt Adhesive, which is commercially available from H. B. Fuller & Co. Alternatively, a double sided adhesive foam tape such as Arclad PE-6174 (a product made by the Adhesive Research Co.) can be used.

The elastic material used as elastic connection 58 may be applied to inside surfaces 62 of backing plate 48 and screw plate 42 using, for example, a conventional hot melt application process wherein the elastic material is applied to the plates in a heated and fluid (viscous) state, using a heated glue-gun, for example. To encourage good adhesion to the metallic surfaces of backing plate 48 and screw plate 42, the entire inside surfaces, or selected portions thereof, may be treated prior to application of the hot-melt elastic material. Such surface-treatment includes scoring, various conventional chemical treatments (acid etching), abrading through grinding or sanding, stamping detents or otherwise roughening the metal surface. The metal surface may also be provided with an opening (not shown) at the point of application of the hot-melt elastic material so that a portion of the fluid elastic material may flow and harden within the opening forming a plastic rivet (not shown).

Figure 6:
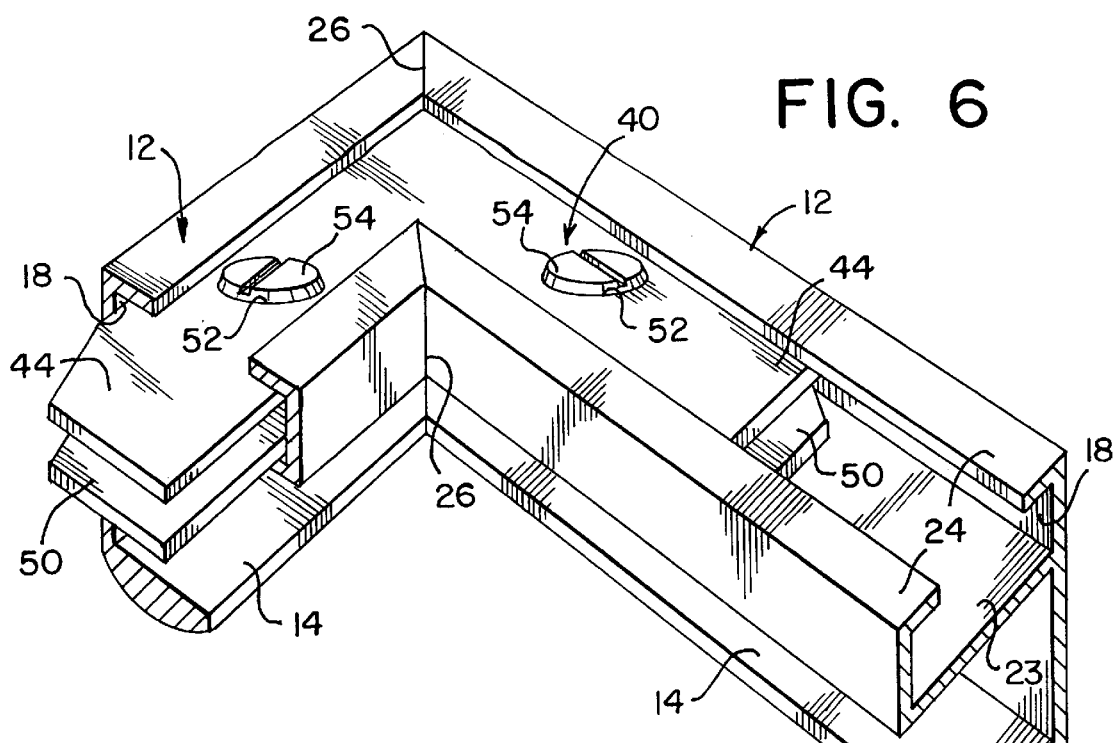
FIG. 6 is a perspective view of the frame clamp assembly of FIG. 3, shown mounted within two picture frame sections (shown in part), according to the invention.
Figure 7:
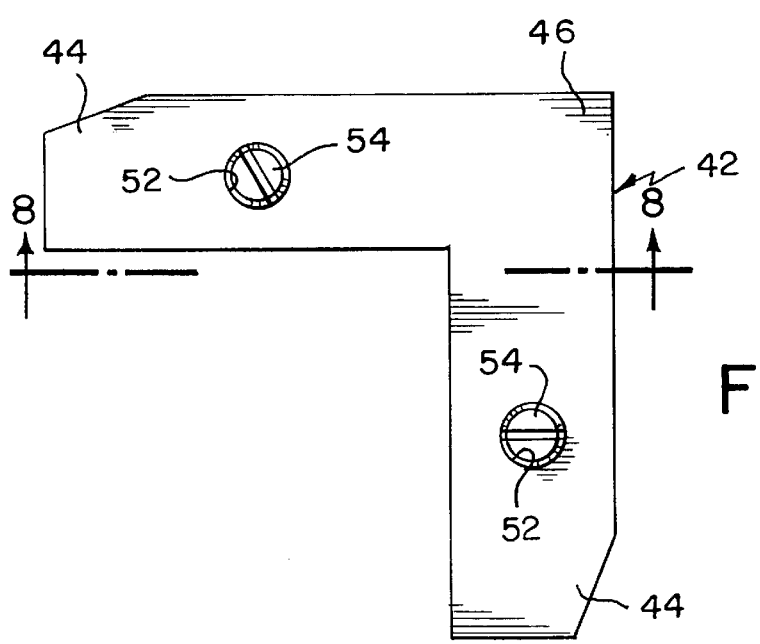
FIG. 7 is a plan view of a screw-retaining L-shaped plate, according to the invention.
Figure 8:
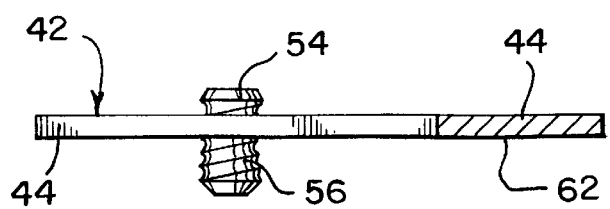
FIG. 8 is a sectional side view of the screw-retaining L-shaped plate, taken along the line 8—8 of FIG. 7, according to the invention.

In operation, a framer holds a single-piece corner clamp assembly 40, as shown in FIG. 4 and simultaneously inserts leg 50 of backing plate 48 and leg 44 of screw plate 42 into a receiving channel 18 of a frame section 12 (frame section 12 includes a mitered end 26). Since the sum of the width of each leg 44 of screw plate 42 (as measured along transverse line 61 in FIG. 4) and offset A is preferably equal to or greater than the corresponding width of receiving channel 18 (as measured along width-line W of FIG. 12), the legs of screw plate 42 will abut against the wall 20 of receiving channel 18 (FIG. 6), while the legs of backing plate 48 abut against the opposing wall 22 of receiving channel 18. Both plates 42 and 48 exert a force against walls 22, 20 depending on the spring bias provided by elastic connection 58. This spring bias tends to force the two frame sections 12 to align with respect to the plates 42 and 48.

After the framer inserts the legs of corner clamp assembly 40 into the receiving channels 18 of the two adjacent frame sections 12, corner clamp assembly 40 will retain the "set" and aligned position of the frame sections 12, allowing the framer to tighten screws 54 to lock the adjacent frame sections 12 in their aligned positions.

Each corner clamp assembly 40 may be easily removed by simple loosening each screw 54.

As noted above, upon reading the detailed description, those skilled in the art appreciate alterations and modification which can be employed without departing from the spirit and scope of the invention, defined in the appended claims.

What is claimed is:

1. For use with a picture frame formed from frame sections, each of said frame sections having a longitudinal receiving channel and mitered ends, an improved corner clamp assembly for securing an adjacent pair of frame sections together along their mitered ends, comprising:

a screw plate having two elongated legs, each elongated leg being sized and shaped to fit within the receiving channel of a frame section;

a backing plate having two elongated legs, each elongated leg being sized and shaped to fit within the receiving channel of a frame section; and an elastic element flexibly connecting said screw plate and said backing plate.

2. The corner clamp assembly according to claim 1, wherein said backing plate is displaced with respect to said screw plate so that when said legs are inserted into said receiving channels, the legs are spring biased by said elastic element, against walls of said receiving channel to thereby tend to cause adjacent frame sections to align with each other along their mitered ends.

3. An improved corner clamp assembly according to claim 1, wherein said elastic element comprises an elastomeric material adhered to contiguous surfaces of said screw plate and said backing plate.

4. An improved corner clamp assembly according to claim 3, wherein said elastomeric material is located approximately at the junctions of the elongated legs of said screw plate and said backing plate.

5. An improved corner clamp assembly according to claim 3, wherein said elastomeric material comprises a hot melt adhesive.

6. An improved corner clamp assembly according to claim 3, wherein said elastomeric material comprises a double-sided adhesive tape.

7. An improved corner clamp assembly according to claim 4, wherein at least one of said backing plate and screw plate includes a hole and said elastomeric material extends through said hole.

8. An improved corner clamp assembly according to claim 2, wherein said elastic element comprises an elastomeric material adhered to contiguous surfaces of said screw plate and said backing plate.

9. An improved corner clamp assembly according to claim 8, wherein said elastomeric material is located approximately at the junctions of the elongated legs of said screw plate and said backing plate.

10. An improved corner clamp assembly according to clam 8, wherein said elastomeric material comprises a hot melt adhesive.

11. An improved corner clamp assembly according to claim 8, wherein said elastomeric material comprises a double-sided adhesive tape.

12. An improved corner clamp assembly according to claim 9, wherein at least one of said backing plate and screw plate includes a hole and said elastomeric material extends through said hole.

13. An improved corner clamp assembly according to claim 2, wherein said backing plate is displaced with respect to said screw plate a distance A, wherein the sum of distance A and the width of each elongated leg is at least equal to the width of the receiving channel.

* * * * *